UNITED STATES PATENT OFFICE.

LEONARD ROBERTS COATES, OF BALTIMORE, MARYLAND.

METHOD OF PRODUCING FERTILIZERS.

947,795. Specification of Letters Patent. Patented Feb. 1, 1910.

No Drawing. Application filed April 26, 1909. Serial No. 492,287.

*To all whom it may concern:*

Be it known that I, LEONARD ROBERTS COATES, of the city of Baltimore and State of Maryland, have invented an Improved Method of Producing Fertilizers, of which the following is a specification.

This invention is based on the discovery which I have made that the insoluble salts of phosphorus, potash and lime are rendered available for the support of plant life, by micro-organisms in natural processes constantly taking place; and the object of the present invention is to produce a commercial fertilizer in which is incorporated the said micro-organisms, together with a suitable food for the same, which micro-organisms when the fertilizer is applied to the soil, will carry out with respect to the insoluble salts present, the processes above described, that is to say,—the rendering available as a plant food of any of the said insoluble salts with which they come in contact The micro-organisms which effect the result above described, are found in breaking-down rock, and although I am not prepared to give to a certainty the exact class to which they belong, it is probable that they are the bacilli *Proteus vulgaris* (Hauser) and classified under the heading "Non-pathogenic bacilli; liquefying," in Sternberg's *Text-book of Bacteriology*, New York, 1901.

In carrying out my invention I take a sterilized culture-mixture preferably an aqueous solution of sugar and phosphate of potash, which is well adapted to promote the life and multiplication of micro-organisms, and to this I add breaking-down rock carrying therewith the micro-organisms which in a natural process are effecting the chemical changes above referred to, or the same micro-organisms wherever found in an active state and not materially contaminated by, or mixed with other micro-organisms which are found to be deleterious to their reproduction, or injurious to plant life when incorporated in a fertilizer. I then take ground raw bone or some other suitable food for bacteria, and after sterilizing the same, moisten it with the pure culture above described.

By this process I produce a concentrated fertilizer composed of a sterilized food inoculated with the micro-organisms which when applied to the soil, will attack the particles of rock containing one or more of the insoluble salts enumerated, and is not contaminated with micro-organisms which have been found to be deleterious to bacterial life or plant growth, and which are commonly propagated in the soil when stable manure is applied thereto. Soil from one farm or situation, like stable manure, may contain micro-organisms which in the present invention are used for the purpose of increasing fertilization, but which if transferred to another farm or situation, may also carry with it, harmful micro-organisms, or deleterious bacteria; and it has been urged by persons who have scientifically experimented with soils, that the practice of using stable manure, or transferring soil from one farm or section of land to another, are operations which should be performed with great caution, and with a full knowledge of the constituents of the manure, or the soil transferred.

From the foregoing it will be understood that a fertilizer produced in the manner described, contains only such micro-organisms as are adapted to render available the insoluble salts of phosphorus, potash and lime, together with a sterilized food which not only sustains the life of the micro-organisms contained in the fertilizer but also those produced by their multiplication in the soil.

The fertilizer described is a concentrated substance, and can be increased in bulk to any extent desired, by combining with it some material such for instance, as ground phosphate rock which has been sterilized by heat or some other suitable process.

I claim is my invention,—

The process of producing a commercial fertilizer, which consists in preparing a sterilized practically solid food for bacteria; then adding to a sterilized culture mixture, breaking-down rock bearing the micro-organisms whereby the insoluble salts of phosphorus potash and lime in the rock are rendered available for fertilizing purposes, and then treating the sterilized food with the inoculated culture mixture, substantially as specified.

LEONARD ROBERTS COATES.

Witnesses:
WM. T. HOWARD,
HUGH L. BOND, 3rd.